(12) United States Patent
Kinnari et al.

(10) Patent No.: US 7,279,052 B2
(45) Date of Patent: Oct. 9, 2007

(54) METHOD FOR HYDRATE PLUG REMOVAL

(75) Inventors: Keijo Kinnari, Sola (NO); Catherine Labes-Carrier, Hafrsfjord (NO); Jim Bob Crawford, Lafayette, LA (US); Larry J. Kirspel, Covington, LA (US); Bill Torrance, Aberdeen (GB)

(73) Assignees: Statoil ASA, Stavanger (NO); Crawford Technical Services, Inc., LaFayette, LA (US)

( * ) Notice: Subject to any disclaimer, the term of this patent is extended or adjusted under 35 U.S.C. 154(b) by 509 days.

(21) Appl. No.: 10/877,307

(22) Filed: Jun. 25, 2004

(65) Prior Publication Data

US 2005/0284504 A1 Dec. 29, 2005

(30) Foreign Application Priority Data

Jun. 24, 2004 (NO) ................... 20042654

(51) Int. Cl.
*B08B 9/04* (2006.01)
(52) U.S. Cl. .................. 134/8; 134/22.12; 15/104.062; 166/311; 166/312
(58) Field of Classification Search .......... 134/8, 134/22.1, 22.12, 167 C, 168 C; 15/104.03, 15/104.061, 104.062; 166/311, 312
See application file for complete search history.

(56) References Cited

U.S. PATENT DOCUMENTS

| | | | |
|---|---|---|---|
| 4,216,738 A * | 8/1980 | Muta ........................... 118/72 |
| 5,244,505 A * | 9/1993 | Allison et al. ............ 134/22.11 |
| 5,695,009 A | 12/1997 | Hipp ........................... 166/196 |
| 6,122,791 A | 9/2000 | Baugh et al. .......... 15/104.061 |
| 6,250,387 B1 * | 6/2001 | Carmichael et al. ........ 166/311 |
| 6,260,617 B1 | 7/2001 | Baugh et al. ............. 166/241.3 |
| 6,315,498 B1 | 11/2001 | Baugh et al. ................ 405/184 |
| 6,343,657 B1 | 2/2002 | Baugh et al. ................ 166/383 |
| 6,651,744 B1 * | 11/2003 | Crawford ..................... 166/311 |
| 6,719,050 B2 | 4/2004 | Longacre ..................... 166/265 |
| 7,025,142 B2 * | 4/2006 | Crawford ..................... 166/311 |
| 2002/0104649 A1* | 8/2002 | Allen ........................... 166/173 |

* cited by examiner

*Primary Examiner*—Michael Barr
*Assistant Examiner*—Saeed T. Chaudhry
(74) *Attorney, Agent, or Firm*—Baker Botts L.L.P.

(57) ABSTRACT

A method for removal of deposits such as hydrate plugs from a pipeline is provided including inserting a thruster pig connected to a return flow line into the pipeline The pig is then advanced forward into the pipeline by pumping a thrusting fluid into an annulus between the pipeline and the return flow line while removing deposits continuously or intermittently and returning flow as appropriate from ahead of the pig through the return flow line. The return flow line is then disconnected from the pig after sufficient deposit removal and retrieved from the return flow line. Next, the pig may then be transported through the pipeline by the pipeline fluid to a pig receiving location once the pipeline flow is resumed.

15 Claims, 2 Drawing Sheets

METHOD FOR HYDRATE PLUG REMOVAL

RELATED APPLICATIONS

The present invention claims the benefit of Norwegian patent application NO20042654 entitled, "Method for Hydrate Plug Removal" filed on Jun. 24, 2004.

The present invention is related to patent application Ser. No. 10/877,274 entitled, "Thruster Pig" which claims the benefit of Norwegian Patent Application No. NO20042655 filed on Jun. 24, 2004.

FIELD OF THE INVENTION

The present invention relates to methods for removal of hydrates, ice, wax and other deposits from pipes. More particularly, the present invention relates to a method for removal of deposits from pipelines using a specific thruster pig, particularly in long subsea pipelines.

BACKGROUND OF THE INVENTION

Hydrates are clathrate compounds, i.e. inclusion complexes, formed by the reaction of molecules of water and another substance such as a hydrocarbon, in which the molecule of water H—OH bond is not split. Particularly in the oil and gas industry the demand for hydrate removal is significant because hydrates can block pipelines. Hydrates can be removed by depressurization, chemical injection or heating. More specifically hydrates can be melted by depressurization or injection of coolant, usually MEG (monoethylene glycol) or methanol, shifting the melting point of the hydrates to below the ambient temperature, or by installing heating cables or other equipment for heating. Ice can be removed by the above-mentioned methods as well. Wax can be melted or dissolved in most organic solvents, thus, injection of organic solvent is in general effective for removal of wax.

The above-mentioned methods can be very time consuming and inefficient if for example the hydrate plugs to be removed are compact or relatively long. Severe hydrate problems are likely for long pipelines subsea at large depths in cold waters, in addition to various deposits such as ice, wax and debris, since the initially warm well fluid is cooled down by cold seawater, thereby inducing condensation, precipitation and hydrate formation. In deepwater fields the high hydrostatic pressure impedes the effectiveness of current practices. In case of a shutdown or failure in the installed equipment for hydrate control, such as an MEG injection system, severe blocking by hydrates often occurs. If the pipe bore is completely blocked with hydrates, hydrate plug removal by using a thruster pig system having a return fluid tubing or flow way connected is feasible, since fluid ahead of the pig must be taken out to avoid pressure buildup against the blockage.

A thruster pig is urged into a pipe by pumping a fluid into the pipe at a location behind the pig such that the pig is advanced further into the pipe by said pressurized fluid providing a motive force pressure differential over the pig. Thruster pigs having coiled tubing connected thereto and have traditionally been designed with connections and coiled tubing both for fluid flow delivery or return as well as for withdrawing both the coiled tubing and the connected pig.

The insertion and withdrawal of pigs connected to coiled tubing become more difficult as the injection length of the pig and coiled tubing increases, the number of bends increases, and the extent of horizontal or upwards sloping sections in the pipe increases. Such difficulties limit the usability of thruster pigs.

A description of pig technology in general and thruster pigs in particular can be found in the U.S. Pat. No. 6,651,744 B1 entitled "Bi-Directional Thruster Pig Apparatus and Method of Utilizing Same" which is considered the closest prior art to the present invention. Relevant background art is also described in U.S. Pat. No. 6,315,498 B1 entitled "Thruster Pig Apparatus For Injecting Tubing Down Pipelines"; U.S. Pat. No. 6,122,791 entitled "Retrievable Pig"; U.S. Pat. No. 6,343,657 B1 entitled "Method of Injecting Tubing Down Pipelines"; and U.S. Pat. No. 6,260,617 B1 entitled "Skate Apparatus for Injecting Tubing Down Pipelines". Hereby all the above-identified publications are incorporated herein by reference.

SUMMARY OF THE INVENTION

Therefore a need has arisen for providing a method of using a thruster pig for freeing long deepwater subsea pipeline sections from hydrate blockage, leaving said pipeline sections in a condition safe for restart.

The present invention relates to improved thruster pig that is feasible for the above mentioned operations. Said improved thruster pig is the subject of the parallel patent application no. (ref:170732-EH), which hereby is incorporated herein in its entirety by reference. The present invention provides a method using said thruster pig to meet the above identified demands.

In agreement with the objective of the invention, a method for removal of deposits such as hydrate plugs from a pipeline is provided including inserting a thruster pig connected to a return flow line into the pipeline The pig is then advanced forward into the pipeline by pumping a thrusting fluid into an annulus between the pipeline and the return flow line while removing deposits continuously or intermittently and returning flow as appropriate from ahead of the pig through the return flow line. The return flow line is then disconnected from the pig after sufficient deposit removal and retrieved from the return flow line. Next, the pig may then be transported through the pipeline by the pipeline fluid to a pig receiving location once the pipeline flow is resumed.

For the purpose of this disclosure, a pipeline means any pipe, pipeline or open bore hole of relatively uniform cross section. Coolant or solvent must be supplied as required, via a separate supply line or by other means, such as admixture with or being used as thrusting fluid. When sending the thruster pig towards a blockage or closed end in a pipe, return fluid is taken out from ahead of the pig to avoid pressure buildup ahead of the pig, in addition to remove inhibited pipeline fluid, debris, small pieces of hydrates, etc. If the pipe is not fully blocked or closed, the pig may be advanced without taking out return fluid. Hydrate plug removal may preferably be undertaken intermittently by using equipment as described in the above-mentioned related application Ser. No. 10/877,274 entitled, "Thruster Pig" which is incorporated by reference herein. Hence, hydrate plug removal preferably takes place when the thruster pig encounters an obstruction in form of hydrates hindering the advancement of the pig, resulting in increased differential pressure over the pig and thereby opening of the apertures and nozzles for hydrate plug removal by spraying coolant. Removal of deposits in this context includes removal of hydrates, ice, wax, debris or any other substance that can be melted by coolant dissolved by solvent or transported by fluid within the pipeline. Other equipment, such as equipment for measuring wall thickness may be connected to the thruster pig.

The return flow line may include any pipe or sections of pipes, such as steel pipe, flexible pipe, composite pipe, reinforced pipe or polymer pipe. However, said return flow line is preferably coiled tubing in particular preferred embodiument coiled tubing retained on one single spool and retrievable by a spool drive as fully inserted into the pipeline with the pig disconnected. The term coiled tubing in this context emphasises any metal pipe, composite pipe, polymer pipe, reinforced pipe or flexible pipe that can be wound onto a spool of a size feasible for handling. The return flow line is preferably dimensioned to be retrieved as fully inserted in the pipe only when the pig is disconnected, resulting in significant savings in labor, weight and cost.

Preferably said disconnection of the return flow line from the pig is undertaken by pumping a ball into said return flow line, thereby disconnecting said connection, said ball preferably being retained in the return flow line after disconnection from the pig. The term ball may include any ball, cylinder or object that can be transported down the return flow line to open the connection, said ball preferably being retained in the return flow line.

Preferably a blanking plug is set in the pig as the return flow line is disconnected, to blank the bore left after disconnecting the return flow line, to increase the thrusting area.

The thrusting fluid preferably comprises coolant or solvent in a concentration effective for removal of deposits. A separate supply line for coolant or solvent may therefore be omitted. Said thrusting fluid is preferably MEG or methanol.

The pressure between said annulus and said return flow fluid line is preferably controlled, to control the pressure differential over the pig and thus the motive force, by using pumps and instrumentation. To this end a pump is preferably installed to take out fluid from the return flow line to decrease the pressure head of the return flow line, preferably connected via control instrumentation to the pump connected to the annulus.

The return fluid is preferably controlled to ensure that the return fluid is sufficiently inhibited against formation of hydrate plugs or other deposits, by instrumentation, sample taking or means for visual inspection.

In a preferred embodiment of the invention, the thruster pig is inserted into the pipeline through a connecting tube arranged from a pig launching chamber in connection with the pipeline to a surface vessel containing coiled tubing, thrusting fluid and appropriate means for equipment and fluid handling.

In another preferred embodiment of the invention, the thruster pig is inserted into the pipeline from a subsea pig launching chamber in connection with the pipeline, with a thrusting fluid line and a coiled tubing line arranged from said launching chamber to a surface vessel containing coiled tubing, thrusting fluid and means for equipment and fluid handling. For said embodiment the thrusting fluid line can be a coiled tubing line and the insertion of the thrusting pig into the launching chamber can be facilitated by using remotely controlled vehicles. Said embodiment may reduce the requirements as to equipment, for example by avoiding a steel riser from the launching chamber to the surface vessel.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
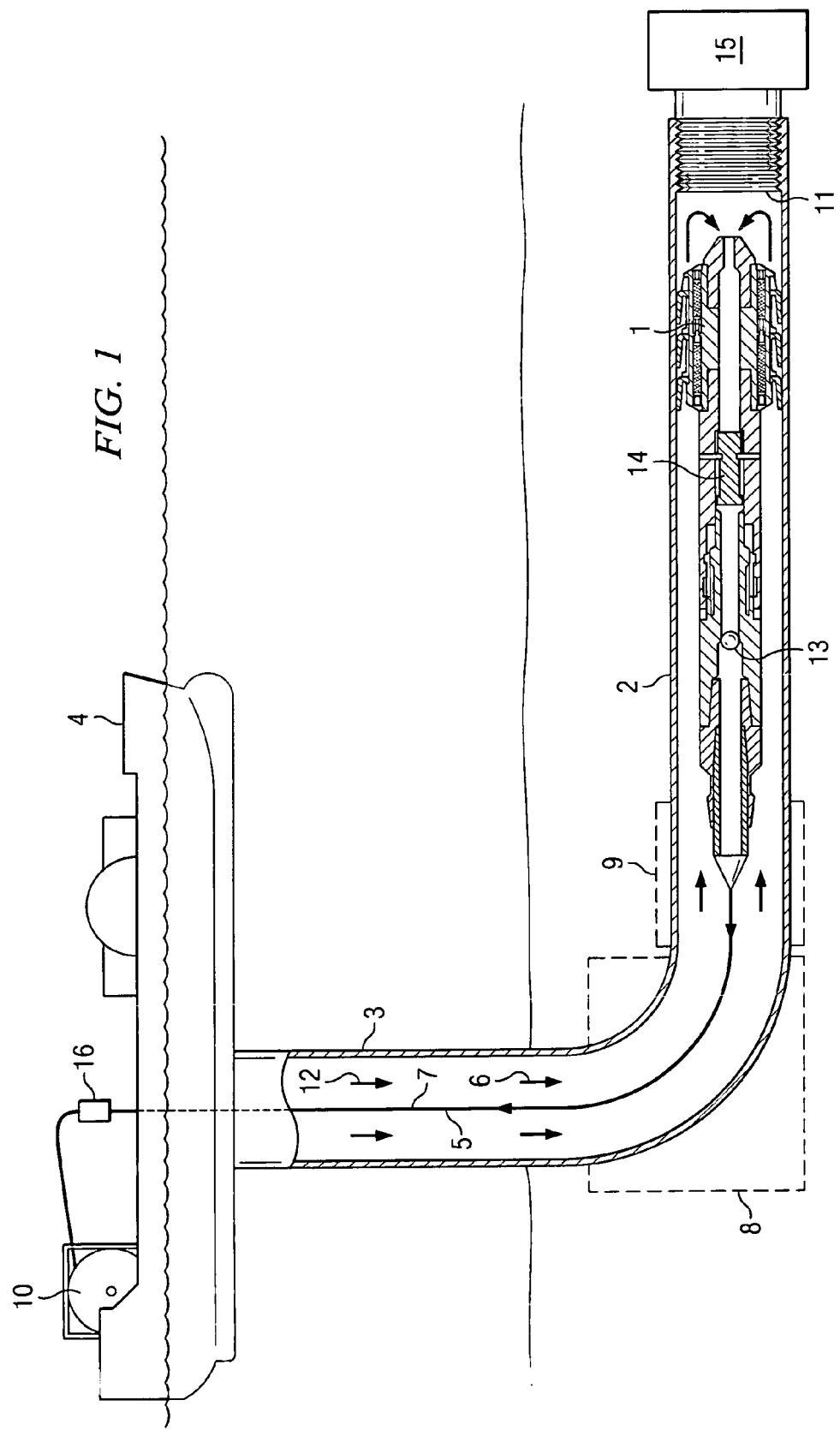
FIG. 1 is an illustration of an embodiment of the method of the present invention.
Figure 2:
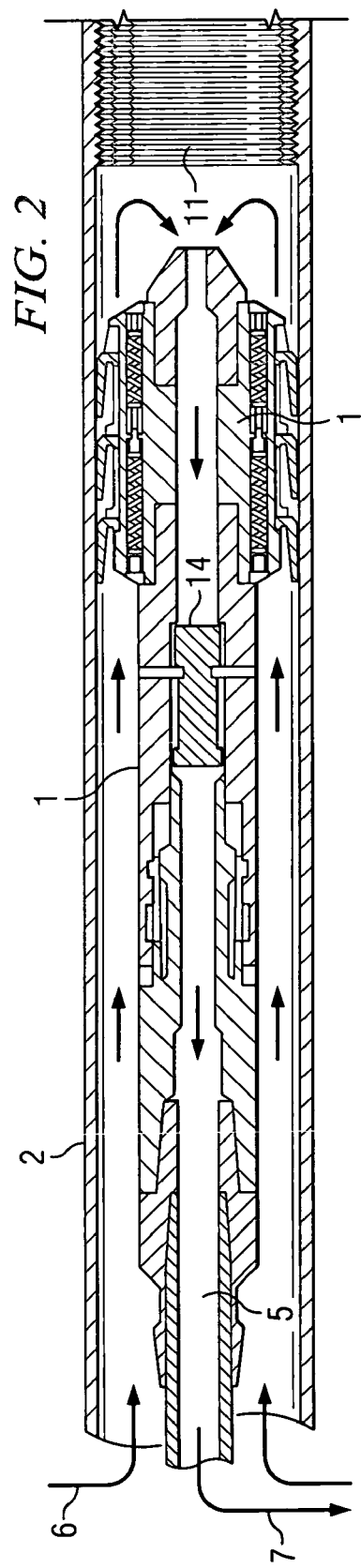
FIG. 2 is an illustration of an embodiment of the method of the present invention, illustrating further details of the thruster pig inside a pipe.
Figure 3:
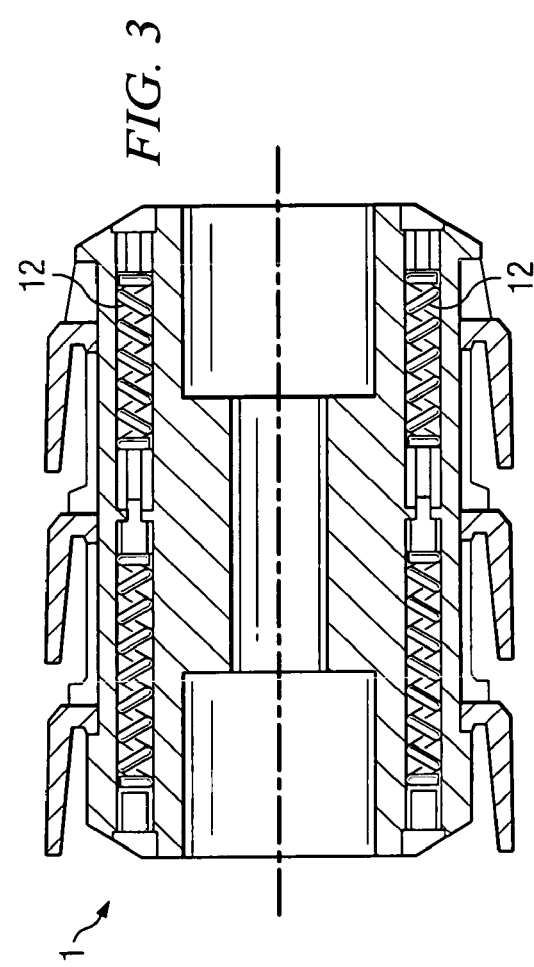
FIG. 3 is an illustration of an embodiment of the thruster pig.

Preferred embodiments of the invention and its advantages are best understood by reference to FIGS. 1 through 3, wherein like numbers refer to like and corresponding parts.

Reference is now made to FIG. 1, which is a schematic illustration of the overall system used with the method for removal of deposits from a pipeline according to the present invention, in the illustrated embodiment for removal of hydrate plugs. A thruster pig 1 is illustrated as located in a pipeline 2. Pipeline 2 is connected via a riser section 3 to a surface vessel 4. Thruster pig 1 is urged into pipeline 2 via riser 3 by pumping a thrusting fluid from vessel 4. The thrusting fluid urges thruster pig 1 forward into pipeline 2, and a coiled tubing return flow line 5 is connected to thruster pig 1 and pulled into the pipeline 2 as the thruster pig 1 is urged forward by the thrusting fluid. Coiled tubing return fluid line 5 conducts return fluid from ahead of thruster pig 1. The fluid flow is provided by one or more pumps as illustrated with arrows 12, of which the action of the thrusting fluid is illustrated with arrows 6 forwards with the urging of the thruster pig, and the return flow through the coiled tubing return flow line is illustrated with arrows 7. Riser 3 provides a connection from the surface vessel 4 to pipeline 2 and is of similar length as the water depth, which can be more than 850 meters. Riser 3 may be, for example, a six inch steel riser. Riser 3 may preferably be connected to for example, a vertical twelve inch launcher (such as pig launching chamber 8) 8 which again is connected to pipeline 2 via, for example, a twelve inch pipeline valve 9. Surface vessel 4 is provided with equipment for handling the coiled tubing and the fluids, such as for example a single 15 km coiled tubing reel 10, a BOP and stripper, thrusting fluid tank and pump, disposal tank for return fluid, optional equipment for return fluid treatment 16, ensure that the return fluid is sufficiently inhibited against formation of deposits, flaring capacity, and further equipment currently common on vessels for intervention. Vessel 4 may also preferably incldue suitable equipment to control the pressure between the annulus of the pipeline and the return flow line to control the pressure differential over pig 1, and, thus, the motive force acting on pig 1.

Thruster pig 1, which may also be referred to as a "pig," is then run with coiled tubing return flow line 5 until hydrate plug 11 and other deposits have been removed. The hydrate/ice plug melting is achieved by jetting with a thrusting fluid comprising coolant. The thrusting fluid is preferably MEG. Alternatively the thrusting fluid can be methanol or any coolant capable of melting the plugs, or hydrocarbon liquid or water with sufficient contents of coolant. The coolant may either be continuously fed through check valves or similar means providing apertures inside the pig body, or alternatively the chemical may be injected intermittently. Fluid from ahead of the pig is returned as appropriate through the return flow line 5. The means for jetting the volume ahead of thrusting pig 1 with coolant to remove plugs can be of various designs, of which the most preferred are the ones providing pressure control for the jetting action, for example by opening an aperture at an adjustably set differential pressure over the thrusting pig 1. When the plugs 11 have been removed, thruster pig 1 can be disconnected from coiled tubing line 2. This is preferably achieved by pumping a ball 13 into the return flow lines, thereby disconnecting return fluid lines from thruster pig 1 while ball 13 is retained within the return fluid line. Ball 13 further acts to insert blanking plug 14 within the pig body to prevent fluid flow therethrough. Coiled tubing return flow line 10 is then retrieved using a winch motor that preferably is acting on the coiled tubing reel 10 (spool drive). The interior of pipeline 2 is left with coolant, ensuring a safe restart of production. Subsequently thruster pig 1 is urged forwards to a pig receiving chamber 15 at another location, by being urged forwards with the pipeline flow.

Reference is now made to FIGS. 2 and 3 that illustrate thruster pig principle during the progression mode in further detail. The thruster pig 1 is urged forwards into the pipeline 2 by the thrusting fluid 6 being pumped into the annulus between the pipeline inner wall and the return flow line 5. A hydrate plug 11 blocks the pipeline bore ahead of thruster pig 1. Some of the thrusting fluid is passed through the thruster pig 1 through dedicated passage ways or apertures 12. To avoid pressure buildup ahead of the thruster pig return fluid is taken out through the return flow line 5 as illustrated by the arrow 7.

The embodiment illustrated schematically on FIGS. 1 and 2 is in general considered the most preferred embodiment of the present invention. However, other embodiments are possible and can be beneficial, for example an embodiment without a connecting tube such as a steel riser, but instead deploying and inserting the thruster pig with return flow line directly into the pig launching chamber 8, with the thrusting fluid being injected through a separate coiled tubing thrusting fluid injection line arranged separately from the surface vessel to the pig launcher 8. Thus, a steel riser can be avoided and the required volume of thrusting fluid can be reduced, which could be a beneficial embodiment for example in very deep water.

Although the present invention and its advantages have been described in detail, it should be understood that various changes, substitutions and alterations can be made herein without departing from the spirit and scope as defined by the following claims.

What is claimed is:

1. A method for removal of deposits from a pipeline, comprising the following steps:
   inserting into the pipeline a thruster pig having a return flow line connected thereto;
   advancing the thruster pig forward into the pipeline by pumping a thrusting fluid into an annulus between the pipeline and the return flow line while removing deposits and returning flow as appropriate from ahead of the pig through the return flow line;
   disconnecting the return flow line from the pig after sufficient deposit removal;
   retrieving the return flow line; and
   transporting the pig further through the pipeline by a pipeline fluid to a pig receiving location.

2. The method according to claim 1 wherein said return flow line comprises coiled tubing.

3. The method according to claim 1 wherein the return flow line comprises coiled tubing constructed of a composite material.

4. The method according to claim 1 wherein the return flow line is coiled tubing retained on a single spool and retrievable by a spool drive after full insertion into the pipeline and disconnection from the thruster pig.

5. Method according to claim 1 wherein full insertion disconnecting the return flow line from the pig further comprises pumping a ball into the return flow line.

6. The method according to claim 5, wherein disconnecting the return flow line from the pig further comprises retaining the ball in the return flow line after disconnection from the thruster pig.

7. The method according to claim 1 further comprising providing a blanking plug in the thruster pig as the return flow line is disconnected, the blanking plug operable to blank the bore left after disconnecting the return flow line.

8. The method according to claim 1 wherein the thrusting fluid comprises a coolant in a concentration effective for removal of deposits.

9. The method according to claim 1, whereby the thrusting fluid further comprises a solvent in a consentration effective for removal of deposits.

10. The method according to claim 1 wherein the thrusting fluid comprises monoethylene glycol.

11. The method according to claim 1 wherein the thrusting fluid comprises methanol.

12. The method according to claim 1 further comprising controlling the pressure between an annulus of the pipeline and the return flow line to control the pressure differential over the pig and thus the motive force.

13. The method according to claim 1 further comprising controlling the return fluid to ensure that the return fluid is sufficiently inhibited against formation of the deposits.

14. The method according to claim 1 further comprising inserting the thruster pig into the pipeline through a connecting tube arranged from a pig launching chamber in connection with the pipeline to a surface vessel providing coiled tubing, thrusting fluid and a means for equipment and fluid handling.

15. The method according to claim 1 further comprising inserting of the thruster pig into the pipeline directly into a subsea pig launching chamber in communication with the pipeline, with a thrusting fluid line and a coiled tubing line arranged from said launching chamber to a surface vessel providing coiled tubing, thrusting fluid and means for equipment and fluid handling.

* * * * *